June 7, 1960
M. G. MOORE
2,939,506
APPARATUS FOR FORMING A HELIX
Filed Aug. 30, 1954
2 Sheets-Sheet 1
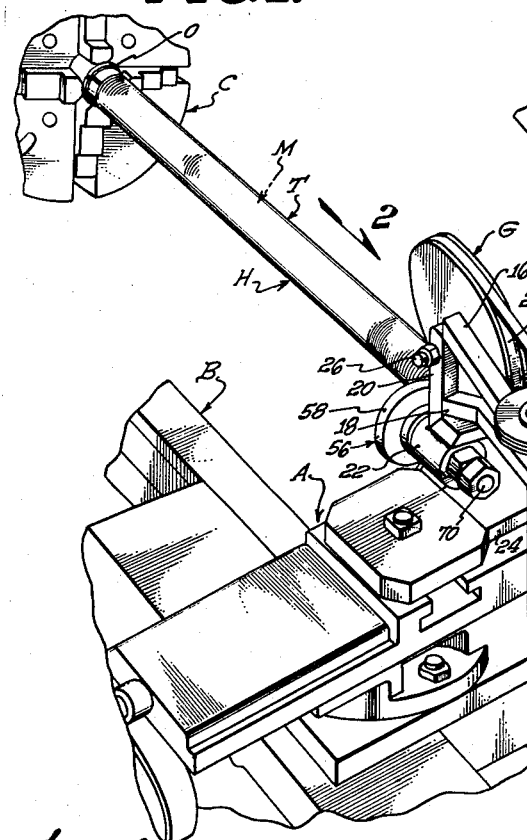
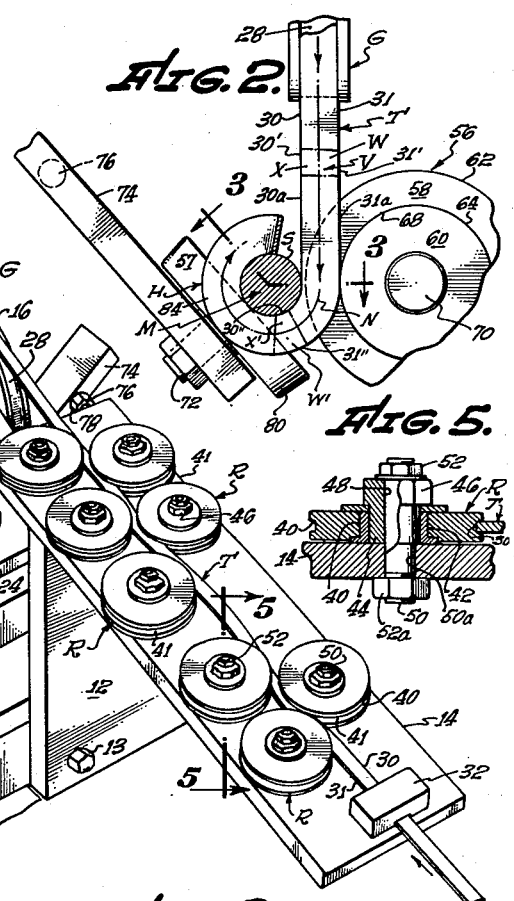
INVENTOR.
MARVIN G. MOORE,
BY
William C. Babcock
ATTORNEY June 7, 1960   M. G. MOORE   2,939,506
APPARATUS FOR FORMING A HELIX
Filed Aug. 30, 1954   2 Sheets-Sheet 2
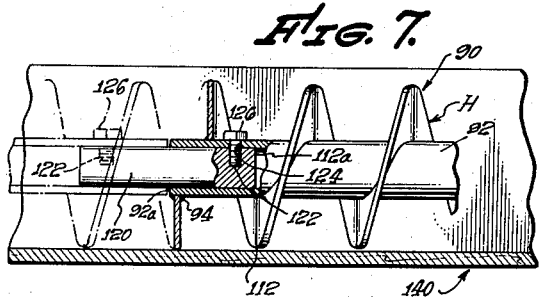
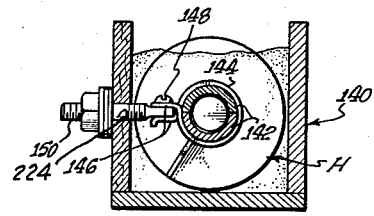
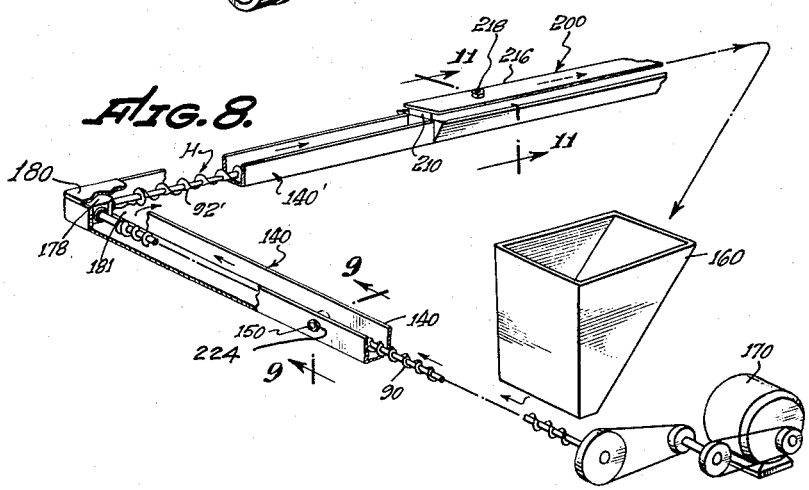
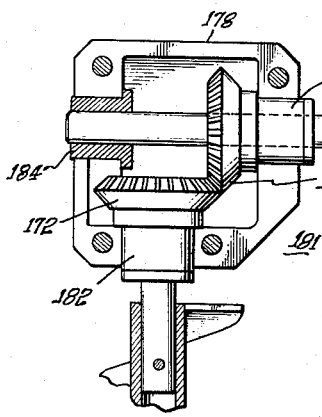
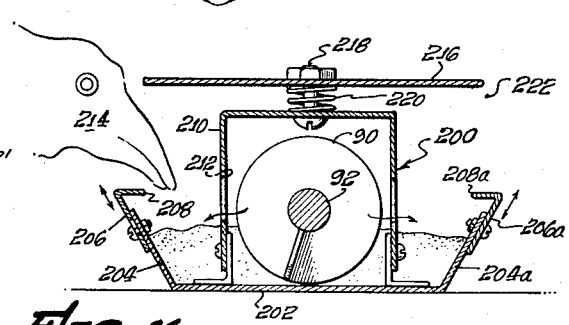
MARVIN G. MOORE,
INVENTOR.
BY
William C. Babcock
ATTORNEY

United States Patent Office 2,939,506
Patented June 7, 1960

2,939,506

APPARATUS FOR FORMING A HELIX

Marvin G. Moore, 2621 Adams St., Long Beach 10, Calif.

Filed Aug. 30, 1954, Ser. No. 452,893

2 Claims. (Cl. 153—2)

My invention relates generally to the field of conveyors, and in particular to an apparatus for winding strip steel into a tight helix that may be subsequently expanded on an elongate member to provide a screw conveyor, the methods of forming and expanding said helix to form a screw conveyor, the screw conveyor resulting from the practicing of said methods, and apparatus particularly adapted for use with the screw conveyor in the moving of comminuted material.

A major object of the present invention is to provide an apparatus whereby steel strip as delivered from the mill may be first transformed into a tightly wound helix in which each of the layers is of a smooth curved configuration with substantially no ripples therein, and the helix so formed that it may be expanded on a lightweight tubular member to provide a screw conveyor that is characterized by the low power requirement in rotating same, the portability thereof, and the ease with which the screw conveyor may be installed when rotatably mounted on novel bearings that form a part of the present invention.

Another object of the present invention is to supply a method of transforming steel strip into a uniformly wound helix by the use of apparatus found in the average machine shop, with helix capable of being produced at a sufficiently rapid rate that the manufacturing cost thereof is relatively low, and the screw conveyor resulting from the use of the helix, as well as the lightweight tubular material in the fabrication thereof permitting the screw conveyor to be sold at a sufficiently low price as to encourage the widespread use thereof.

A still further object of the invention is to supply a lightweight screw conveyor that is ideally adapted for use in moving grain and granular feed material at a rate suitable for chickens or turkeys to feed therefrom.

Yet another object of the invention is to provide a screw conveyor of novel design that is particularly adapted for use with various types of elongate feeders used on chicken and turkey ranches.

These and other objects and advantages of the invention will become apparent from the following description of preferred forms thereof and from drawings illustrating those forms in which:

Figure 1 is a perspective view of the invention disposed on a lathe and in a position to form steel strap into a tightly wound helix;

Figure 2 is a combined front elevational and vertical cross sectional view of the invention taken in the direction 2 of Figure 1;

Figure 3 is an enlarged fragmentary sectional view taken on the line 3—3 of Figure 2 and showing a portion of the rotating mandrel on which the helix is formed;

Figure 4 is a fragmentary plan view of a chuck supporting the helix forming mandrel and showing the manner in which the strap may be removably affixed thereto;

Figure 5 is a vertical cross sectional view of one of the strap stressing rollers, showing the eccentric mounting therefor, and the manner by which the mounting may be laterally adjusted and locked in the desired position;

Figure 6 is a perspective view of a light tubular member rotatably disposed to have the tightly wound helix uniformly expanded thereof to define a screw;

Figure 7 is a fragmentary vertical cross sectional view of two of the tubular screw bearing members axially disposed and their end portions removably joined for rotating purposes;

Figure 8 is a perspective diagrammatic view of the tubular screw bearing members rotatably supported for feed conveying purposes;

Figure 9 is a vertical cross sectional view of the tubular screw bearing member rotatably supported on a bearing that may be removably mounted on the side wall of a trough in which granular material is disposed for longitudinal movement;

Figure 10 is a perspective view of a pair of split bearings used with the removable bearing support shown in Figure 9;

Figure 11 is a perspective view of a chicken feeder that embodies the use of the screw bearing tubular member, and is of such design that the height of the feeding opening may be easily regulated; and Figure 12 is a combined plan and horizontal cross sectional view of a bearing box in which the end portions of two normally disposed tubular screw bearing members are disposed, and connected by gear means to permit either one of the members to drive the other.

Referring now to the drawings for the general arrangement of the invention, it will be seen in Figure 1 that the power driven chuck C of a lathe drivingly supports a rigid elongate mandrel M in a horizontal position. Mandrel M is formed with a cylindrically shaped exterior surface S of uniform diameter on which steel strap T is wound in the form of a tight helix H.

A carriage A is mounted on the bed B of the lathe, which carriage rotatably supports a number of strap stressing rollers R and guide rollers G, to be described in detail hereinafter. Before the forming operation, the outer free end portion of strap T is bent into a normally disposed leg L that removably engages a collar O mounted on the mandrel M as shown in Figure 4.

In detail, the part of the invention utilized in guiding the strap T onto the rotating mandrel M includes a rigid rectangular plate 12 that is removably affixed by bolts 13 to the side of carriage A opposite to chuck C. An elongate rectangular support 14 is mounted on the upper end of plate 12, and a first upwardly projecting, angularly disposed arm 16 is provided on that end of this support nearest chuck C. A second arm 18 positioned below arm 16 is so affixed to support 14 as to extend outwardly and downwardly therefrom at an angle. An upright 20 is rigidly affixed to the outer ends of arms 14 and 16, the lower end of which upright is connected to a tubular member 22 that is disposed parallel to mandrel M. Member 22 is welded or otherwise secured to a transversely positioned base 24 resting on the upper portion of carriage A that is retained thereon by the bolts or other conventional means.

In Figures 1 and 2 it will be seen that the guide roller G of relatively large diameter is rotatably supported from upright 20 on a stub shaft 26 projecting therefrom. A circumferentially extending groove 28 is formed in roller G that is slightly wider than the width of strap T which is fed therethrough. The roller G is so disposed relative to mandrel M that the inner edge of the strap is tangential to surface S and in a substantially vertical plane. Before reaching roller G, strap T slides across the upper surface of plate 14 and is directed thereover by a U-shaped guide 32. Inasmuch as the strap will be rapidly formed into a helical spiral when it reaches that position shown in Figure 2 relative to mandrel, it is first subjected to a preliminary working and stressing operation to relieve the severity of internal strain set up in the metal band as it assumes the curvature defined by the mandrel.

Referring to Figure 2, it will be seen that the two edges 30 and 31 of the strap are subjected to completely different forces during permanent distortion of the strap on the rotating mandrel M. A first portion 30a of the strap T that extends inwardly from edge 30 is subjected to compression as the helix H is formed, and a second portion 31a of the strap extending inwardly from edge 31 is concurrently placed under tension during this forming operation. It will be apparent that a longitudinally extending line-like neutral axis N will be created in the strap between the two inwardly extending portions 30a and 31a which is not subjected to compressive force.

It will be understood that the extent of dislocation and degree of reorientation of the grains or particles comprising the homogeneous metal mass of the strap T will be in proportion to the distance existing between the stressed strap portion and axis N during formation of the helical coil. In other words, the greater the distance between the stressed portion of the strap and axis N, the greater the particle dislocation and degree of reorientation. Cold-rolled steel has been found to be an ideal metal for the fabrication of strap T. Also it has been found from experience that the ductility of cold-rolled steel may be decreased to a predetermined value by working. This decreased ductility is obtained by causing the strap to be deformed in the plane of the face surfaces alternately to opposite sides of the longitudinal centerline of the strap. The metal from which strap T is fabricated must of necessity be of a predetermined ductility in order that the helix H of the present invention is formed with layers of smooth configuration.

To more clearly illustrate the occurrence of sudden dislocation of the minute metal particles comprising strap T as it is deformed into a helical coil, an imaginary rectangular strap segment W that has been subjected to the stressing action of rollers R is shown in phantom line in Figure 2. This segment W is furthermore considered to embody two sub-segments X and V that are separated by the neutral axis N. Segment X has an exterior edge of unit length generally designated 30' and segment V an exterior edge of unit length 31'. After the strap has moved to a point where segment W forms a segment W' of the helix, as seen in the drawing, it will be noted that many changes have taken place. Due to the fact that edge 30' has been compressed to less than unit length 30'', segment W' has assumed a trapezoidal rather than rectangular configuration, and edge 31' has lengthened from unit length to that of greater than unit length, identified by the numeral 31''.

In order that the extreme edge portions of strap T subject to maximum compression and tension during the helix forming operation are of the proper ductility, alternate lateral forces are exerted thereon as they pass between rollers R. Circumferentially extending grooves 40 of slightly greater width than the thickness of strap T are formed in rollers R. Each roller R is provided with a suitable bearing 42 that rotatably engages a short vertical shaft 44 having a head 46 mounted on the upper end thereof, which head prevents displacement of the bearing from said shaft.

A vertical, eccentrically situated bore 48 is formed in each shaft 44, and a stud bolt 50 extends therethrough, as well as through a bore 50a formed in plate 12. Nuts 52, 52a engage the ends of stud bolt 50 whereby when these nuts are tightened, the shaft is gripped between the upper face of plate 12 and the lower face of nut 52. By loosening nut 52 it is possible to manually rotate shaft 44 and laterally adjust a roller R to exert the desired pressure on strap T. In Figure 1 it will be seen that stud bolts 50 are alternately arranged in laterally spaced sequence, and as a result, the rollers R subject the strap T passing therebetween to deforming pressure, first on one side and then on the other. The magnitude of this deforming pressure is, of course, controlled by lateral adjustment of rollers R.

After working of the strap T to decrease the ductility while obtaining suitable tension thereon, it is very shortly thereafter guided onto the rotating mandrel M to be formed into the helix H. Concurrent with the formation of the helical coil, each layer of the helix is subjected to compression against the already formed portion of the helix by a roller 56 disposed normal to the axis of the mandrel, and another roller 57 that is angularly positioned and in rotatable contact with the outermost layer. The roller 56 (Figures 1, 2 and 3) is formed with an annular flange 58 having a hub 60 of considerably smaller diameter extending outwardly therefrom. Flange 58 is fabricated to provide a circumferential face 62 that tapers in a direction away from wall 66 of roller 56 at an angle of substantially 2° inwardly toward the axis of roller 56, and the circumferential face 64 of hub 60 tapers out and away from helix H at an angle of substantially 3°. As shown in Figure 3, face 64 and a side wall 66 of flange 58 cooperatively define an annular junction line 68. Roller 56 is rotatably supported on a shaft 70 that is mounted in tubular member 22 and held therein by conventional locking means.

It has been found from experience that a smoothly wound, tightly compressed helix H may best be formed on the mandrel M if edge 31 of the strap just engages the hub face 64 at a point adjacent the junction line 68. The roller 57 is rotatably supported on a stub shaft 72 that extends upwardly from a bar 74, which bar is pivotally mounted on a stud bolt 76 projecting from that end of support 14 nearest the roller G. Bar 74 may be adjusted to any desired position by loosening and then tightening nuts 78 associated with bolt 76. The circumferential face 80 of roller 57 tapers outwardly away from edge 30 of surface 82 of the foremost layer 84 of the helix H during formation thereof on mandrel M, as shown in Figure 2. The taper of circumferential surfaces 62, 64 and 80 is critical to the formation of a helix having layers of a smooth regular configuration. Generally, however, the taper of surfaces 62, 64 and 80 which will provide layers of maximum regularity and smoothness in a helical coil will lie between 2° and 6°.

In practical application the operation of the invention is extremely simple. Strap T is first threaded through guide 32 across support 14 between rollers R and then extended over guide roller G downwardly into contact with rollers 57 and 58 (Figures 2 and 3) to mandrel M where the free end thereof is removably affixed to the slotted collar. It will be understood that when the free end of the strap is affixed to the collar, carriage A has been moved on bed B to a position adjacent chuck C.

Thereafter mandrel M is caused to rotate, the strap T moves downwardly from the guide roller as shown in Figure 2, and assumes the shape of a helix H, the diameter of which is determined by that of the mandrel on which it is formed. Alternate lateral deformation of the strip 30 as it passes between offset rollers R can only be accomplished by the expenditure of a work force thereon, which force in the present invention is provided by the power-driven mandrel M. The extent of lateral deformation of strip 30 either to the right or left as it passes between rollers R, as well as the number of such lateral deformations which take place, determines the work force that must be supplied by the mandrel M to move the strip 30 between rollers R, the greater the tension will be on that portion of strip 30 after passing between the rollers, and before it contacts circumferential surfaces 62, 64 and 80. Thus, the tension on a segment W is increased to any desired increment by means of lateral adjustment of rollers R from a minimum prior to entrance of the strip segment between the rollers to a maximum after it has passed therethrough to occupy a position such as shown in Figure 2. During this forming operation, carriage A is manually moved away from chuck C, but at such a rate that the helix being formed is at all times under compression exerted by contacting rollers 57 and 58. In the event the layers of strap T should be irregular or wavy in configuration, rollers R may be laterally adjusted to increase the compression exerted thereby on the strap edges, as well as to the degree of alternate lateral direction movement of the strap as it passes therebetween, as previously described in detail.

Mandrel rotation is stopped after a tightly wound helix H is formed thereon and the carriage A is moved whereby the helix may be removed and utilized in the fabrication of a lightweight screw conveyor 90 such as shown in Figure 6. The screw conveyor assembly includes a lightweight tubular member 92, one end of this is mounted in the chuck C. Helix H is slidably mounted on member 92 through the center opening thereof and one free end 94 of the helix is rigidly affixed to member 92. The two adjoining layers 96 and 96a of the helix nearest the chuck are then spread apart to a pitch therebetween at which it is desired to form the screw, and a block 98 of wood or other suitable means is inserted therebetween to maintain the coils in uniform selected pitch relationship.

A C-clamp 100 having an arm 102 and a pressure plate 104 that may be moved relative thereto is provided. Block 98 is held between layers 96 and 96a by arm 102, while an elongate shell 106 having an interior surface 108 of concave transverse configuration is held in movable contact with the exterior edges of the helix H by pressure plate 104.

Chuck C is then caused to rotate member 92, with the clamp being held stationary, which rotation moves block 98 away from the chuck to thereby spread the helix layers or coils at uniform pitch distances 110. Member 92 is rotated until a portion of helix H is disposed on the full length thereof, at which time the helix is cut to provide an end 112 that is flush with the end 92a of the tubular member. This operation may be repeated successively if desired.

As shown in Figure 7, present invention is adapted for easy assembly of screw conveyors of any desired length by axially aligning a series of tubular members 92, with each member having a helical coil H mounted thereon. The helix H must be separately mounted on each member 92 in order to provide a screw of uniform pitch extending substantially throughout the assembly whereby material may be transferred thereby without bunching at the junction points of the tubular sections. The aligned members 92 may then be removably secured to provide a conveyor of the desired length by inserting rod segments 120 within the confines of the abutting end portions of each member 92. Tapped openings 122 are formed in these rod segments, which openings may be vertically aligned with an opening 124 formed in members 92. Bolts 126 removably engage the aligned openings 122 and 124 to maintain the members as an integral rotatable screw conveyor.

The screw conveyor shown in Figure 8 is adapted for use in moving grain or similar granular material when placed in an elongate trough 140 of U-shaped cross section of conventional fabrication. When the screw conveyor is of relatively long run, as when it consists of a plurality of conveyors 90 joined in the fashion described above, it is desirable to provide some supporting means intermediate the ends of the long run of conveyor. In providing such support helix H is interrupted to provide a support bearing location. To facilitate mounting of conveyors 90 in a rotatable position in trough 140, as well as to permit ready removal therefrom, two graphitic semi-cylindrical bearings 142 are provided for each support (Figure 10), and the pair of bearings 142 define an opening of a diameter equal to the external diameter of member 92 or equal to the external diameter of rod segment 120, depending upon which method of support is appropriate at the particular location. In the construction shown in Figure 9, bearings 142 are supported on member 92, a portion of helix H having been removed to provide a bearing location. Alternately, referring to Figure 7, it is apparent that two conveyors 90 could be axially spaced to expose between their adjacent ends 92a a portion of rod segment 120. Bearings 142 of appropriate curvature can then be placed directly on rod segment 120 between adjacent ends 92a of conveyors 90. In either case, the two bearings 142 are gripped within the confines of a resilient loop 144 in an encircling, conveyor-supporting position. The free end portions 146 of the loop are substantially parallel, and have eyes formed therein which are removably engaged by a screw 148, or other suitable fastening means. Screw 148 also engages a horizontally disposed eye bolt 150 extending through one side wall of trough 140 at a height appropriate for rotatable support of the screw conveyor within the confines thereof. Figure 9 illustrates one manner in which the conveyor 90 is rotatably supported in the trough 140. An installation such as might be used on a turkey or chicken ranch is diagrammatically shown in Figure 8. In this assembly a hopper 160 delivers feed material into trough 140 in which a screw conveyor is rotatably supported therein by the bearings 142 above described. Conveyor 90 is rotated by means of a motor 170.

Should it be desirable to change the direction or angle of the trough 140, the first run of conveyors 90 is terminated in a beveled gear 172 that engages a second beveled gear 174 mounted on the forward end of a second conveyor 90' which is out of alignment with conveyor 90. In order that no portion of the material conveyed will become engaged by gears 172 and 174, these gears are positioned within confines of housing 178 which is provided with a removable cover 180.

Housing 178 is so designed and is of such construction as to provide a passage 181 at the junction area of the two troughs 140 and 140' to permit passage of material therethrough. Tubular member 92 is rotatably supported by a bearing 182 disposed in one side wall of housing 178, and tubular member 92' is similarly supported by two bearings 184 and 186 as shown in Figure 12. A housing of this type has been found most satisfactory for this purpose as the first conveyor continuously delivers material to passage 181, and after a certain quantity thereof has accumulated in the passage, it is urged forwardly to a position where it may be picked up by conveyor 90', by delivery to passage 181 of additional material. After the initial material transfer from conveyor 90 to conveyor 90', the flow of material through the passage is continuous.

In conjunction with the conveyors above described, it has been found advantageous to use the chicken feeder 200 shown in Figure 11 that includes an elongate pan 200 formed with a base 202 from which two identical side walls 204 and 204a extend upwardly and outwardly at an angle. Two angle-shaped members 206 and 206a are removably affixed to the upper portions of these side walls, and have inwardly extending legs 208 and 208a respectively, which serve to prevent overflow of feed.

An elongate housing 210, preferably fabricated from sheet metal, encloses the screw conveyor 90, and is affixed to the pan by conventional means. Housing 210 has openings 212 formed in each side thereof through which feed may flow into the pan as depleted by the fowl 214. A lightweight elongate rectangular plate 216 is adjustably supported for vertical movement on the top of the housing by a plurality of spaced screws 218 and helical springs 220. The height of the opening 222 through which the fowl feed is regulated by vertical adjustment thereof. In this type of feeder, that portion of the material conveyed which is not required to replenish the feed supply is simply returned to the hopper from which it may again be transferred as above described.

Although the forms of the invention herein shown are adapted for both short and long conveyor runs, it will be apparent that the latter installations will be more numerous on a chicken or turkey ranch. The factors of expansion and contraction of long conveyor installations, as well as the extent to which the conveyor is capable of flexing are important. For these reasons, therefore, the bearing supports 150 are mounted in elongate openings 224 formed in the trough 140. If desirable, two screw conveyors may be run in the same trough adjacent one another, which arrangement is particularly desirable with inclined trough runs.

While the invention shown and described are fully capable of achieving the objects and providing the advantages hereinbefore mentioned, it is to be understood that they are merely presently preferred embodiments thereof and there is no intention of limiting same to the details of construction other than as defined in the appended claims.

The invention claimed is:

1. A device for use in forming a smooth surfaced, tightly wound helix upon a lathe from an elongate strip of substantially greater width than thickness and formed of a material the ductility of which decreases with cold working by the deformation thereof, which includes: an elongate power-driven mandrel of annular cross-section, said mandrel being rotatable in a fixed position upon said lathe; a carriage longitudinally movable upon the ways of said lathe relative to said mandrel; an elongate rigid support mounted on said carriage, said support being a rigid horizontal plate affixed to said carriage above said ways and extending away from the head stock of said lathe but parallel to the bed thereof; guide means being a slotted block mounted on said plate through which said strip passes; rotatable means for directing said strip downwardly to said mandrel after said strip has traversed said support; a plurality of rigid rollers capable of engaging the edge faces of said strip, said strip being passed through said block prior to contacting said rollers; a plurality of upwardly extending roller supporting means disposed on alternate sides of that portion of said strip situated on said support; means for laterally moving and locking said roller supporting means in positions where said rollers exert sufficient lateral pressure on said edge faces of said strip in rolling contact therewith to laterally deform said strip as it passes therebetween and to progressively increase the tension on said strip as it approaches said mandrel; means to removably affix a free end of said strip to said mandrel and cause said strip to be wound thereon with the face surfaces of said strip disposed substantially normal thereto; and means mounted on said carriage which concurrently exerts a laterally directed force on the outer edge face of said strip as said strip is wound on said mandrel and a compressive force on the forwardly disposed face surface of said strip to form said strip into said helix, said face surfaces of which are in contact one with the other.

2. A device for use in forming a smooth surfaced, tightly wound helix upon a lathe from an elongate strip of substantially greater width than thickness and formed of a material the ductility of which decreases with cold working by the deformation thereof, which includes: an elongate power-driven mandrel of annular cross section, said mandrel being rotatable in a fixed position upon said lathe; a carriage longitudinally movable upon the ways of said lathe relative to said mandrel; an elongate rigid support mounted on said carriage, said support being a rigid horizontal plate affixed to said carriage above said ways and extending away from the head stock of said lathe but parallel to the bed thereof; guide means that movably maintain said strip in a longitudinally extending position on said support, said guide means being mounted on said plate through which said strip passes; means for directing said strip downwardly to said mandrel after said strip has traversed said support; a plurality of rigid rollers capable of engaging the edge faces of said strip, said strip being passed through said guide means prior to contacting said rollers; a plurality of upwardly extending roller supporting means disposed on alternate sides of that portion of said strip situated on said support; means for laterally moving and locking said roller supporting means in positions where said rollers exert sufficient lateral pressure on said edge faces of said strip in rolling contact therewith to laterally deform said strip as it passes therebetween and to progressively increase the tension on said strip as it approaches said mandrel; means to removably affix a free end of said strip to said mandrel and cause said strip to be wound thereon with the face surfaces of said strip disposed substantially normal thereto; and means mounted on said carriage which concurrently exerts a laterally directed force on the outer edge face of said strip as said strip is wound on said mandrel and a compressive force on the forwardly disposed face surface of said strip to form said strip into said helix, said face surfaces of which are in contact one with the other.

References Cited in the file of this patent

UNITED STATES PATENTS

| Number | Name | Date |
|---|---|---|
| 265,078 | Hewitt | Sept. 26, 1882 |
| 361,998 | Green | Apr. 26, 1887 |
| 390,357 | Gathman | Oct. 2, 1888 |
| 665,262 | Peck | Jan. 1, 1901 |
| 744,018 | Aiken | Nov. 17, 1903 |
| 744,671 | Aiken | Nov. 17, 1903 |
| 820,507 | Layne | May 15, 1906 |
| 834,220 | Aiken | Oct. 23, 1906 |
| 843,767 | Gustavsen | Feb. 12, 1907 |
| 1,216,657 | Cardell | Feb. 20, 1917 |
| 1,271,703 | Guibert | July 9, 1918 |
| 1,406,215 | O'Brien | Feb. 14, 1922 |
| 1,447,299 | Freeman | Mar. 6, 1923 |
| 1,463,461 | Caldwell | July 17, 1923 |
| 1,738,994 | Gredell | Dec. 10, 1929 |
| 1,809,144 | Noonan | June 9, 1931 |
| 1,866,181 | Turner | July 5, 1932 |
| 1,914,975 | Nigro | June 20, 1933 |
| 1,950,623 | Owston | Mar. 13, 1934 |
| 1,954,525 | Hallden | Apr. 10, 1934 |
| 2,004,388 | Dewald | June 11, 1935 |
| 2,018,209 | Gogan | Oct. 22, 1935 |
| 2,046,460 | Johnson | July 7, 1936 |
| 2,094,204 | Carter | Sept. 28, 1937 |
| 2,106,866 | Best | Feb. 1, 1938 |
| 2,118,289 | Birkenbeuel | May 24, 1938 |
| 2,180,046 | Gleissner | Nov. 14, 1939 |
| 2,279,133 | Cross | Apr. 7, 1942 |
| 2,433,966 | Vankeuren | Jan. 6, 1948 |
| 2,498,813 | Lea | Feb. 28, 1950 |
| 2,643,863 | Buschow | June 30, 1953 |
| 2,669,012 | Bruegger | Feb. 16, 1954 |
| 2,693,219 | Heller | Nov. 2, 1954 |

FOREIGN PATENTS

| 595,071 | Great Britain | Sept. 28, 1944 |